Sept. 6, 1932.  W. L. R. EMMET  1,876,515
SHAFT PACKING
Filed April 22, 1931
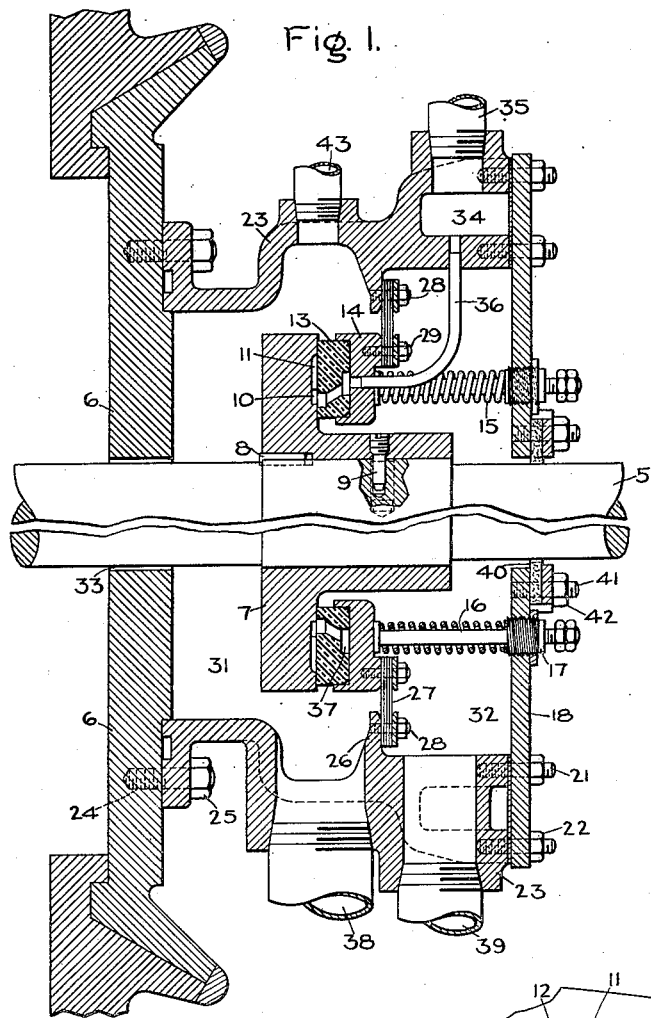
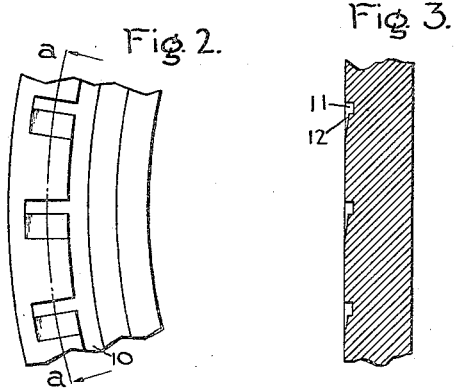
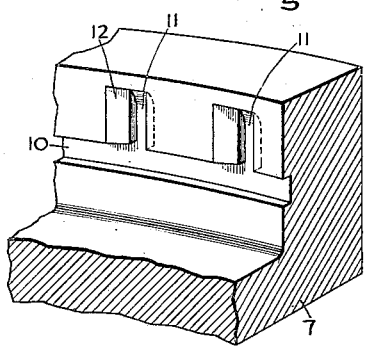
Inventor:
William L. R. Emmet,
by Charles E. Mullen
His Attorney.

Patented Sept. 6, 1932

1,876,515

UNITED STATES PATENT OFFICE

WILLIAM L. R. EMMET, OF SCHENECTADY, NEW YORK, ASSIGNOR TO GENERAL ELECTRIC COMPANY, A CORPORATION OF NEW YORK

SHAFT PACKING

Application filed April 22, 1931. Serial No. 532,029.

The present invention relates to shaft packings for preventing leakage between a shaft or like rotating member and the surrounding casing wall through which said shaft projects, and has for its object an improved packing which is well adapted for use with an elastic fluid turbine system although it is not necessarily limited thereto.

For a consideration of what I believe to be novel and my invention, attention is directed to the following description and claims in connection with the drawing appended thereto.

In the drawing, Fig. 1 illustrates in cross section and partly diagrammatic a packing arrangement embodying my invention; Fig. 2 is a side elevation of a part of Fig. 1; Fig. 3 is a sectional view taken along line a—a of Fig. 2, and Fig. 4 is a perspective view of the part shown in Figs. 2 and 3.

Referring to Fig. 1, 5 designates a shaft projecting through a wall 6 of an elastic fluid engine and supported at its right end by any suitable bearing, not shown in the drawing. An annular member 7, hereafter termed a runner, is secured to said shaft by suitable means, in the present instance shown as a key 8 and a screw 9. The runner is preferably made of stainless steel and has a flange-like portion which is provided with an annular groove 10 and radial grooves 11, as shown in Fig. 2. The radial grooves extend radially outwardly from said annular grooves and have beveled entrance edges 12, as illustrated in Fig. 3. The purpose of said grooves and beveled entrance edges will be hereinafter explained.

13 designates a sealing ring made of wood or like material and seated in an annular holder 14. The sealing ring is yieldingly pressed against the surface of said runner by the provision of springs 15 and bolts 16, the latter being slidably arranged within sleeves 17 in the outer wall 18. Wall 18 is secured by means of bolts 21 and nuts 22 to the outer casing 23. The latter is fastened by suitable means, such as bolts 24 and nuts 25, to wall 6 of the turbine casing. Provided at the inner surface of casing 23 is an annular projection 26 to which the outer part of a flexible ring 27 is secured by means of bolts 28; the inner circumference of said ring being fastened to ring holder 14 by means of bolts 29. The flexible ring 27 may be formed of rubber or several layers of thin sheet metal.

It will be noted that the flexible ring 27 defines together with the adjacent parts and the outer casing walls two chambers 31 and 32 of which the first communicates with the vacuum of the engine through the small clearance 33 between shaft 5 and wall 6.

Provided in the outer casing wall is a chamber 34 to which water or like liquid may be supplied by means of a conduit 35, and which is connected by suitable means, in the present instance shown as flexible tubes 36, preferably made of rubber, to annular recesses 37 of sealing ring 13. Water or like liquid may thus be supplied from said chamber 34 through said flexible tubes to the annular grooves 10 and the radial grooves 11 of the runner. Due to the rotation of the runner and the beveled entrance edges of the radial grooves, water or like liquid is drawn between said runner and sealing ring 13 whereby a sealing film is formed between said runner and ring. This film causes comparatively small friction losses between the rotating and stationary parts. The water or like liquid also causes little wear of the parts engaging each other and at the same time forms a cooling medium for these parts. A part of the sealing and cooling liquid may leak to chambers 31 and 32 and may be drained off therefrom by suitable means, such as conduits 38 and 39 respectively, and pumped back into chamber 34 by suitable means, not shown in the drawing. 40 represents a felt ring secured to the outer plate 18 of the casing by means of screws 41 and nuts 42 to form a seal between said outer plate and the shaft of the engine.

In case the new packing arrangement is to be used in connection with a mercury turbine it is necessary to prevent water and air from coming into contact with the mercury vapor. This may be achieved in the present instance by the provision of a conduit 43 in the outer casing through which a gas low in oxygen and at a pressure slightly above that of the atmosphere may be supplied to chamber 31.

In accordance with the provisions of the patent statutes I have described my invention together with the apparatus which I now consider to represent the best embodiment thereof, but I desire to have it understood that the apparatus shown is only illustrative and I do not wish to be limited thereto.

What I claim as new and desire to secure by Letters Patent of the United States, is:

1. The combination with a rotating shaft and a wall through which said shaft projects, of a packing for preventing leakage along said shaft, said packing comprising a casing surrounding the shaft and secured to the wall, an annular member rigidly secured to the shaft and provided with an annular groove and radial grooves which extend outwardly from said annular groove and are provided with beveled edges, a sealing ring, a holder for the sealing ring, a flexible annular member having its inner edge secured to the holder and its outer edge secured to the casing, means for yieldingly pressing said sealing ring against said runner and means for supplying water to said annular and radial grooves whereby said water forms a sealing film between said runner and ring.

2. The combination with a rotating shaft and a wall through which said shaft projects, of a packing for preventing leakage along said shaft, said packing comprising a casing surrounding the shaft and secured to the wall, a runner rigidly secured to said shaft and having an annular groove and radial grooves provided with beveled edges which extend outwardly from said annular groove, a thrust ring having an inner and an outer radial groove and holes communicating between said inner and outer groove, means for supporting the thrust ring and preventing leakage between the casing and the thrust ring, means for yieldingly pressing said thrust ring against said runner, and means for supplying a liquid to said grooves whereby said liquid forms a sealing film between said runner and ring.

3. The combination with a rotating shaft and a wall through which said shaft projects, of a packing for preventing leakage along said shaft, said packing comprising a runner rigidly secured to said shaft and having an annular groove and radial grooves provided with beveled edges and extending outwardly from said annular groove, a thrust ring having an inner and an outer groove and holes between said inner and outer groove, means for yieldingly pressing said thrust ring against said runner and means for supplying a liquid to said grooves whereby said liquid forms a sealing film between said runner and ring, said last mentioned means comprising a water chamber, a plurality of flexible tubes connecting said water chamber with the grooves of said sealing ring.

In witness whereof, I have hereunto set my hand.

WILLIAM L. R. EMMET.